(12) United States Patent
Earnest, Jr. et al.

(10) Patent No.: US 7,122,609 B2
(45) Date of Patent: Oct. 17, 2006

(54) HIGH MELT FLOW FLUOROPOLYMER

(75) Inventors: Thomas Robert Earnest, Jr., Greenville, DE (US); Daniel A. Favereau, Chambesy (CH); Niall D. McKee, Newark, DE (US); Patricia A. Tooley, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/872,623

(22) Filed: Jun. 21, 2004

(65) Prior Publication Data

US 2004/0260044 A1    Dec. 23, 2004

Related U.S. Application Data

(63) Continuation-in-part of application No. 10/832,831, filed on Apr. 27, 2004.

(60) Provisional application No. 60/470,308, filed on May 14, 2003.

(51) Int. Cl.
*C08F 14/18*    (2006.01)
(52) U.S. Cl. ............ 526/254; 526/242; 525/192; 525/200; 525/11; 174/36
(58) Field of Classification Search ............ 526/254, 526/242; 525/11, 192, 200; 174/36
See application file for complete search history.

(56) References Cited

U.S. PATENT DOCUMENTS

| | | | |
|---|---|---|---|
| 4,546,157 A * | 10/1985 | Nakagawa et al. | 526/247 |
| 4,743,658 A | 5/1988 | Imbalzano et al. | |
| 5,182,342 A | 1/1993 | Feiring et al. | |
| 5,677,404 A * | 10/1997 | Blair | 526/247 |
| 5,703,185 A | 12/1997 | Blair | |
| 5,945,478 A | 8/1999 | Buckmaster et al. | |
| 6,103,844 A | 8/2000 | Brothers | |
| 6,395,848 B1 * | 5/2002 | Morgan et al. | 526/214 |

FOREIGN PATENT DOCUMENTS

| | | | |
|---|---|---|---|
| EP | 423995 | * | 4/1991 |
| EP | 720992 | * | 7/1996 |
| EP | 0759446 | * | 2/1997 |
| EP | 0 423 995 B1 | | 3/1998 |
| EP | 1170303 | * | 1/2002 |
| EP | 1 260 526 A1 | | 11/2002 |
| EP | 1260526 | * | 11/2002 |
| WO | WO 03/059969 A1 | | 7/2003 |
| WO | WO 2004/104057 | | 12/2004 |
| WO | WO-2004/104057 | * | 12/2004 |
| WO | WO 2004/104057 A1 | | 12/2004 |

OTHER PUBLICATIONS

George Odian, Principles of Polymerization, (1991), p. 241, Third Edition, John Wiley & Sons, Inc., New York.

* cited by examiner

*Primary Examiner*—David W. Wu
*Assistant Examiner*—Henry S. Hu

(57) ABSTRACT

The present invention relates to a partially-crystalline copolymer comprising tetrafluoroethylene, hexafluoropropylene in an amount corresponding to a hexafluoropropylene index (HFPI) of from about 2.8 to 5.3, and preferably from about 0.2% to 3% by weight of perfluoro(alkyl vinyl ether), said copolymer being polymerized and isolated in the absence of added alkali metal salts, having a melt flow rate of within the range of about 30±3 g/10 min, and having no more than about 50 unstable endgroups/$10^6$ carbon atoms can be extruded at high speed onto conductor over a broad polymer melt temperature range to give insulated wire of high quality.

7 Claims, No Drawings

HIGH MELT FLOW FLUOROPOLYMER

BACKGROUND OF THE INVENTION

1. Field of the Invention

This invention relates to a high melt flow copolymer of tetrafluoroethylene and hexafluoropropylene capable of being extruded at high speed.

2. Description of Related Art

U.S. Pat. No. 5,677,404 discloses an improved fluoropolymer, wherein the improvement enables the fluoropolymer to be extruded at high speeds without sacrifice of stress crack resistance. This polymer is successfully extruded on to a conductor to make insulated wire of high quality (fewer than 10 sparks and 2 lumps/13 km of conductor coated) at speeds in excess of 1900 ft/min (579 m/min). The UL 444 industry standard for spark failures is no more than 15 spark failures per 45,000 ft (13.7 km) of coated conductor. A spark failure indicates a fault in the insulation. Industry prefers that no more than 10 spark failures be present/13.7 km of insulated conductor to insure acceptable insulated conductor. An additional quality criterion desired by the industry is that for the same length of coated conductor, the insulation should have no more than 2 lumps/13.7 km. Lumps in the insulation interfere with the ultimate use of the insulated conductor; e.g. twisting together to form twisted pair conductors, pulling the insulated conductor through narrow openings.

Speeds up to 2250 ft/min (686 m/min) can be easily achieved. Higher speeds are possible but non-polymer specific limitations arise. Therefore production of good quality insulated conductor at line speeds of from about 1750 to 2250 ft/min (533 to 686 m/min) is considered excellent performance. However, it has been found that the temperature of the molten polymer in extrusion must be closely controlled to achieve excellent performance. Loss of control results in unacceptably high incidences of insulation faults such as sparks (points at which the polymer inadequately coats the conductor) and lumps (regions of irregular geometry of the insulation). It has further been found that lot-to-lot variations in the fluoropolymer melt flow rate can upset the close control of extrusion and require time-consuming and wasteful adjustments, during which time unsaleable product is made. Reduction in fluoropolymer melt flow rate variation would impose significant economic penalties.

Further polymer improvement is needed to permit high speed extrusion, particularly for extrusion of fluoropolymer insulation with few or no sparks or lumps over a broader temperature range than is now possible.

BRIEF SUMMARY OF THE INVENTION

It has been found that a partially-crystalline copolymer comprising tetrafluoroethylene with hexafluoropropylene in an amount corresponding to HFPI of from about 2.8 to 5.3, said copolymer being polymerized and isolated in the absence of added alkali metal salts, having a melt flow rate of within the range of about 30±3 g/10 min, and having no more than about 50 unstable endgroups/$10^6$ carbon atoms can be extruded at high speed onto conductor over a broad polymer melt temperature range to give insulated wire of high quality.

Another advantage of the copolymer of the present invention as will be described in Example 1, is the ability of the copolymer to enjoy long extrusion runs without the need for shut down to clean the polymer extrusion tooling. This advantage is embodied in the process comprising extruding the copolymer of described in the preceding paragraph, wherein the copolymer is substantially free of alkali metal salt, at a melt temperature of at least about 740° F. (393° C.) and shear rate of at least about 800 sec$^{-1}$.

DETAILED DESCRIPTION OF THE INVENTION

The fluoropolymers according to this invention are partially crystalline; i.e. they are not elastomers. They are copolymers of tetrafluoroethylene (TFE) and hexafluoropropylene (HFP). Copolymers are here defined as polymers made by polymerizing two or more monomers. This includes dipolymers of TFE and HFP wherein the HFP content of the copolymer, characterized by an hexafluoropropylene Index (HFPI), is about 2.0–5.3. The TFE/HFP copolymers of this invention also include polymers comprised of TFE, HFP, and perfluoro(alkyl vinyl ether) (PAVE) wherein the alkyl group contains 1 to 5 carbon atoms. Examples of such vinyl ethers include perfluoro(methyl, ethyl, and propyl vinyl ether) (PMVE, PEVE, and PPVE respectively). Typically the HFP content of the copolymer will be characterized by an hexafluoropropylene Index (HFPI) of about 2.0–5.3. HFPI is the ratio of two infrared absorbances measured on a film of the copolymer, which can be converted to wt % HFP by multiplying by 3.2 as disclosed in the paragraph bridging cols. 3 and 4 of U.S. Pat. No. 5,703,185. The TFE/HFP copolymer exhibits an MIT flex life of at least about 1000 cycles, preferably at least about 2000 cycles, and more preferably at least about 4000 cycles. Measurement of MIT flex life is disclosed in U.S. Pat. No. 5,703,185. Generally the amount of PAVE monomer incorporated in the polymer according to this invention will be from about 0.2 to 3 wt %, based on the total weight of the copolymer. One preferred PAVE is perfluoro(propyl vinyl ether) and the most preferred PAVE is perfluoro(ethyl vinyl ether). The melt flow rates (MFR) of FEP copolymers are determined in accordance with ASTM D1238. The MFR of polymers according to this invention are in the range of about 27 to 33 g/10 min, preferably about 28 to 32 g/10 min.

Polymerization is conducted in the absence of added alkali metal salts. The general procedure of Example 1 of U.S. Pat. No. 5,677,404 is followed. However, the initiator is made up with only ammonium persulfate. Potassium persulfate, a common alternative initiator or co-initiator with ammonium persulfate, is not used. It is also possible to use organic initiators as disclosed in U.S. Pat. No. 5,182,342. The water for polymerization and washing is deionized. In the above-mentioned Example 1, the copolymer is TFE/HFP/PEVE, though PPVE, PMVE, and other PAVE monomers, and combinations of these monomers, can be substituted. MFR is controlled by the rate of addition of initiator to the polymerization. After polymerization, the resulting polymer dispersion is coagulated by mechanical agitation. Coagulation may also by done by freezing and thawing, or by chemical addition. Acids or ammonium salts may be used in chemical coagulation, but metal salts, particularly alkali metal salts may not. It is further preferred that alkaline earth metal salts not be used in the process, for example as coagulants, and that materials of construction of polymerization and processing equipment be chosen so that corrosion will not be a source of metal ions. The alkali metal ion content of the polymer is measured by x-ray fluorescence. For potassium as the analyte, the lower detection limit is 5 ppm in the polymer. Polymer according to this invention has less than 50 ppm alkali metal ion, preferably less than about 25 ppm, more preferably less than about 10 ppm, and most preferably about less than about 5 ppm.

Polymers made using deionized water and polymerized and isolated without the use of alkali metal salts are referred to herein as being substantially salt-free.

It has been found that at high line speed in the conductor coating operation, the presence of alkali metal salt in the fluoropolymer promotes the formation of fluoropolymer drool on the outer surface of the extrusion die and/or on the guider tip that is inside the die, through which the conductor passes, and this drool is periodically carried along the melt cone to the insulation on the conductor to appear as unacceptable lumps of insulation. This not the only source of lumps. Too high or too low polymer melt temperature can also cause lumps. The presence of alkali metal salt in the fluoropolymer contributes to the lump problem. The copolymer of the present invention is free of, i.e. does not contain, alkali metal salt in the sense that no alkali metal salt is used in the polymerization or in the isolation of the resulting fluoropolymer.

The method of determination of alkali metal ion in the polymer can be illustrated by way of example of the determination of potassium ion. The analytical method is x-ray fluorescence (XRF). The XRF instrument is standardized with polymer containing known amounts of potassium ion. The zero ppm standard is made by polymerization in a potassium-ion free environment and with a potassium-free recipe. For standards at other concentrations, the absolute values of potassium ion content are determined by proton induced x-ray emission (PIXE).

Polymers according to this invention are fluorinated as disclosed in U.S. Pat. No. 4,743,658 to convert thermally or hydrolytically unstable end groups to the stable —$CF_3$ endgroup. By thermally unstable is meant that the endgroup reacts, usually by decomposition, at temperatures at which fluoropolymers are melt-processed, generally between 300 and 400° C. Examples of unstable endgroups affected by the fluorine treatment are —$CF_2CH_2OH$, —$CONH_2$, —COF, and —COOH. Fluorination is conducted so as to reduce the total number of the four types of unstable endgroups to no greater than about $50/10^6$ carbon atoms in the polymer backbone. Preferably, the sum of these unstable endgroups after fluorine treatment is no greater than about $20/10^6$ carbon atoms, and with respect to the first three-named endgroups, preferably less than about 6 such endgroups/$10^6$ carbon atoms. The fluorine treatment is followed by the sparging of the fluorine-treated pellets as disclosed in U.S. Pat. No. 4,743,658, to rid the fluoropolymer of extractable fluoride.

The superiority of the polymer according to the present invention over the lower MFR polymers exemplified in the prior art is seen in the broader temperature range over which it can be extruded on to conductor to give high quality insulation. A further advantage of the polymer is its processibility at temperatures lower than polymers used in these applications heretofore.

EXAMPLES

A series of extrusion/melt draw-down processes are conducted using the extruder for melt draw-down extrusion coating of the copper conductor, all as described in Example 10 of U.S. Pat. No. 5,703,185. The line speed is 2000 ft/min (610 m/min). The melt temperature of the copolymer is the temperature of the molten copolymer in the transition section between the extruder and the crosshead wherein the molten resin and the conductor are both traveling in the same direction. The melt temperature is measured by a thermocouple contacting the melt. This is the general procedure used in the tests described hereinafter. 45,000 ft (13.7 km) lengths of fluoropolymer insulated copper conductor are produced, which are then tested for sparks and lumps. The average of three runs (3×13.7 km lengths) are used for each spark and lump determination. The tests for sparks and lumps are conducted in-line on the insulated conductor. The spark test is carried out by exposing the outer surface of the insulation to a voltage of 2.5 kV and recording spark failures. Lumps are measured optically by laser measurement of changes in the diameter of the insulation. An increase in diameter of at least 50% is considered a lump. When spark failures exceed the quality limit, lump failures may not be reported.

The composition of the copolymer of the Examples is like that of Example 10: TFE/HFP/PEVE approximately 87/12/1 wt %. Melt flow is varied by varying initiator feed during polymerization. This method is disclosed on p. 241 of Principles of Polymerization, $3^{rd}$ Ed, published by John Wiley (1991), and in the sentence bridging cols. 3 and 4 of U.S. Pat. No. 6,103,844 and is the general method for changing MFR of the copolymer in later Examples described herein.

Example A

The fluoropolymer is the copolymer described above having an MFR of 22 g/10 min of the aforesaid Example 10, draw-down ratio of is 97:1, and the melt temperature is 760° F. (404° C.). The insulated conductor exhibits 1 sparks and 0 lumps, acceptable quality.

Example B

Repetition of Example A, but decreasing the melt temperature to 757° F. (403° C.), results in the insulated conductor exhibiting greater than 3.5 sparks. At 754° F. (401° C.) the insulated conductor exhibits 13.6 sparks. When the melt temperature is further decreased to 750° F. (399° C.), the insulated conductor exhibits 38 sparks. When the melt temperature is further reduced to 740° F. (393° C.), the insulated conductor exhibits 151 sparks. At 720° F. (382° C.) melt temperature, the insulated conductor exhibits 620 spark failures. The increase in lumps follows a similar pattern. Example B reveals the extreme sensitivity of the extrusion/melt draw-down process to small changes in melt temperature when polymer of this MFR is used.

Example C

Repetition of Example A, but increasing the melt temperature to 767° F. (408° C.), decreases the melt strength of the cone, leading to increasing spark failures and increasing degradation of the fluoropolymer as indicated by the presence of black specs in the insulation. The decrease in melt strength also periodically produces complete rupture of the insulation. Shortening of the cone length helps avoid rupturing, but the window of operation within which acceptable spark failures are obtained is only on the order of several ° C., which is too narrow for commercial operation.

Example D

Repetition of Example A, but decreasing the draw-down ratio to 85:1, results in the insulated conductor exhibiting greater than 10 spark failures. The draw-down ratios used in the invention generally range from about 60 to 120:1. The reduction from 97:1 to 85:1, which here causes unacceptable quality, is too narrow a range for the level of commercial operability desired by the industry.

While high quality insulated conductor is producible using the copolymer of patent Example 10, Examples B–D show that the window of operating conditions is quite narrow, making it difficult for different manufacturers to obtain the same desired result of both high quality and high line speed. As the line speed is reduced from 2000 ft/min (610 m/min), the frequency of spark failures is reduced.

Example E

In this test, copolymer of increased MFR (26 g/10 min) is used. Within the draw-down ratio range of 60–100:1, the melt temperature range over which insulated conductor of acceptable quality can be produced at a line speed of 610 m/min is only 5° F. (2.8° C.), which is narrower than the variation in melt temperature typically present in the industry. Outside this narrow melt temperature range, either the spark failures exceed 10 or the lumps exceed 2, or both.

Example F

In this test, the MFR of the copolymer is increased to 35 g/10 min and, using the melt temperature of Example A, the resultant insulated conductor exhibits 20 spark failures and 20 lumps, inadequate quality.

Example G

In this test, the MFR of the copolymer is 30 g/10 min and using the melt temperature of Example A, the resultant insulated conductor exhibits greater than 10 sparks and greater than 2 lumps, thereby having inadequate quality.

Example H (The Invention)

Example G is repeated except that the melt temperature is decreased to 740° F. (393° C.). Surprisingly, the resultant insulated conductor passes both the spark and lump tests, exhibiting 0–3 sparks and 0–1 lumps in repeat testing. This same result is obtained when the melt temperature is changed within the range 734 to 746° F. (390 to 397° C.) and the draw down ratio is 80–100:1. The same result is obtained when the MFR of the copolymer is varied within the range of 28–32 g/10 min, except that the melt temperature range of operability shifts slightly, e.g. at the MFR of 32 g/10 min, the melt temperature of 748° F. (398° C.) provides acceptable quality. The same result is obtained when the range of draw-down ratios in narrowed to 60–100:1, except that the melt temperature window narrows to 7° C. These good results are obtained when the copolymer is pigmented white or orange and the cone length is in the range generally used in industry (25 to 75 mm). As the MFR or melt temperature moves out of these ranges, the occurrence of sparks and lumps increases drastically. The MFR range of 30±3 g/10 min and melt temperature range of 393° C.±6° C. include the transition from acceptable quality to borderline quality, the narrower MFR and melt temperature ranges giving the most consistent highest quality results. These results are obtained when the line speed is varied from 533 m/min to 686 m/min and give the appearance of being obtainable at even higher line speeds, which were not tested because of the limits of practical controllability in commercial operation. When the melt temperature is decreased below 730° F. (388° C.), e.g. in the range of 720–729° F. (382–387° C.), or above 750° F. (399° C.), the quality of the insulated conductor at the line speed of 610 m/min becomes unacceptable.

The results of Example H show that the polymer according to this invention can be extruded over an adequate range of operating conditions with respect to melt temperature, range of draw ratios, cone length, and differences in pigmentation, for making high quality product in industrial operation. The fact that the polymer melt temperatures are lower rather than higher than typical polymer melt temperatures is advantageous because temperature-related polymer degradation is reduced. In addition the polymer according to the invention, being made and isolated in the absence of alkali metal salts, has increased thermal stability compared to alkali metal ion containing fluoropolymers. Furthermore, the polymer can be made within the product specifications under the normal operating conditions of fluoropolymer manufacture.

In the foregoing Examples, copolymers of different MFRs are tested over a range of melt temperatures typically varying by at least 30° F. and more often 40° F. Within the range of 720° F. to 767° F. (382 to 408° C.), it has been discovered that a relatively narrow melt temperature range centered around 740° F. (393° C.) provides the acceptable result, with unacceptable results arising sharply outside the narrow melt temperature range.

The preferred copolymers of the present invention have an MFR in the range of about 30±3 g/10 min, are free of alkali metal salt, and have low unstable endgroups as described above, when melt drawn at a melt temperature in the range of about 393° C.±6° C., through a broad range of draw down ratios such as 80–100:1, give wire insulation of high quality. More preferably, the MFR is in the range of about 30±2 g/10 min and said melt temperature is in the range of about 393° C.±4° C. and the draw-down ratio can be in the range of about 60–120:1, and preferably the extrusion/melt draw-down process is conducted wherein the operating window to produce acceptable quality insulated conductor at a line speed of at least about 533 m/min is achieved within each of these ranges.

Example I

Another unexpected advantage of the copolymer of the present invention is its improved extrudability under severe conditions of both a high melt temperature and high shear rate. High temperature, e.g. at least about 740° F. (393° C.), exposes the copolymer to degradation. The same is true of high shear, e.g. at least about 800 sec$^{-1}$, which causes localized overheating of the copolymer, also tending to cause degradation. The presence of alkali metal salt in the copolymer promotes the degradation process, resulting in the plate out (deposit) of degraded copolymer on the die tooling, i.e. the die surface(s) in contact with the molten copolymer forming the outlet of the die. In the case of coating (insulating) of a wire with the copolymer, the wire guide (guide tip), forms the inner surface of the tubular extrudate, whereby the inner surface of the die and the outer surface of the die tip form the tooling surfaces on which degraded copolymer deposits. This deposit changes the size of the extrudate and forms a roughness on the outer surface of the extrudate (wire coating). This roughness looks similar to melt fracture, but is not curable by reducing the rate of extrusion. This problem is aggravated by the presence of pigment in the copolymer, present to provide color to the wire insulation. This problem is further aggravated by the presence of boron nitride foam cell nucleating agent as is typically present when the wire insulation is to be foamed as it exits the extrusion die. The pigment and boron nitride interact with the plating of degraded copolymer on the die tooling to increase the rate of plate out. When the effect of the plate out becomes noticeable on the appearance of the extrudate or its change from desired dimension, the extrusion operation must be stopped for clean-out of die tooling. This results in lost production time and production of excessive scrap copolymer.

The stable end groups of the copolymer of the present invention tend to prevent degradation of the copolymer, but this is not sufficient when the extrusion is carried out both at high temperature and high shear. The absence of the alkali metal salt from the copolymer of the present invention importantly contributes to a greatly reduced rate of plate out, even when pigment and/or boron nitride are present in the copolymer, such as in the following amounts 0.08 to 0.15 wt % pigment and 0.5 to 0.8 wt % boron nitride, based on the total weight of the copolymer, these amounts being typical for the function intended.

The shear rate to which the copolymer is subjected is a function of the size of the die opening and the volumetric flow rate of the molten copolymer through the die opening. The smaller the opening, the higher the shear at a given flow rate. In the extrusion coating of wire with the copolymer, the die opening is the annular orifice formed by the inner surface of the die and the outer surface of the die tip. As described in col. 9, l. 58–62 of U.S. Pat. No. 5,945,478, the shear rate is calculated from the equation $6q/(H^2 \times \pi D)$, wherein q is the volumetric flow rate of molten FEP, H is the gap distance between the die (inner surface) and the die tip (outer surface), and D is the circumference of the gap at its midpoint (average diameter).

Some extrusion operations require a small gap, e.g. in the case of extrusion foaming involving gas injection into the extruder to act as the foaming agent at the outlet of the die, a small gap is necessary to build up sufficient pressure within the extruder to keep the gas foaming agent, e.g. nitrogen, dissolved in the molten polymer, so that foaming is delayed until extrusion from the die. A small gap results in a small draw down ratio (DDR). DDR is the ratio of the cross-sectional area of the annular die opening to the cross-sectional area of the finished wire insulation. High speed extrusions, e.g. line speeds of 1500 to 2000 ft/min (457 to 609 m/min) are carried out at high DDR, e.g. 80 to 100:1. The small gap required for extrusion of foamed insulation (foamed as the extrudate exits the die) requires a DDR of no greater than 25:1, thereby resulting in slower line speeds, e.g. 800 to 1200 ft/min (244 to 367 m/min). In Example 10 of U.S. Pat. No. 5,703,185, referred to hereinbefore, the DDR to obtain a cone length of 2 in (5.1 cm) and line speed of 457 m/min to 914 m/min was 97:1.

Using extrusion equipment similar to Example 10 of '185 for extruding the copolymer similar to Example H at a melt temperature of 740° F. (393° C.) and high shear rate (greater than 800 sec$^{-1}$) provides an extrusion result wherein no plate out is visible after continuous operation for more than twice the time at which alkali metal salt containing polymer would be causing plate out. Thus productivity is more than doubled using the copolymer of the present invention in the high shear (low DDR)/high temperature extrusion process.

In greater detail, the FEP copolymer used in this Example has an HFPI of 3.8, less than 50 unstable end-groups, no detectable alkali metal salt content, and MFR 30 g/10 min. The copolymer (composition) also contains 0.5 wt % boron nitride and 0.1 wt % TiO$_2$ pigment. The nitrogen pressure in the extruder is 3500 psi (24.13 MPa) and the DDR is 15:1 and line speed is 1000 ft/min (305 m/min). The die tooling for obtaining this DDR to obtain wire insulation having an outer diameter of 0.034 in (0.09 cm) over an 0.0201 in (0.051 cm) diameter wire is as follows: 0.129 in (0.33 cm) inner diameter of the die and 0.072 in (0.18 cm) outer diameter of the die tip. The shear rate to which the copolymer is subjected with this tooling and volumetric flow rate of 22.95 lb/hr (10.42 kg/hr) is 2764 sec$^{-1}$. When the tooling is changed to 0.166 in (0.42 cm) die inner diameter and 0.093 in (0.24 cm) tip outer diameter to give a DDR of 25:1, the shear rate decreases to 1308 sec$^{-1}$ at the same volumetric flow rate and line speed. As the DDR increases (gap increases) above 25:1, the foaming result becomes poorer because of premature foaming within the die tooling. To mathematically show the profound effect of DDR on shear rate, when the tooling is changed, i.e. the gap is increased, to provide a DDR of 80:1 (die inner diameter of 0.297 in (0.75 cm) and die tip outer diameter of 0.167 in (0.42 cm), the shear rate drops to 230 sec$^{-1}$ at the same volumetric flow rate and line speed. If the line speed is increased to 2000 ft/min (609 m/min) in the same tooling giving a DDR of 80:1, the shear rate increases to 460 sec$^{-1}$. The foaming process is inoperable at this high DDR.

Example J

Still another unexpected advantage of the copolymer of the present invention is the reduced dissipation factor of high speed data transmission cable made using the copolymer of the present invention as insulation covering the electrical conductor of the cable. Thus, the partially-crystalline copolymer comprising TFE and HFP in an amount corresponding to HFPI of from about 2.8 to 5.3, said copolymer being substantially free of alkali metal salt, having a melt flow rate of within the range of about 30±3 g/10 min, and having no more than about 50 unstable endgroups/10$^6$ carbon atoms, provides a surprising reduction in dissipation factor when used as the primary insulation of such high speed cable. The absence of alkali metal salt from the copolymer is obtained, as described above, by carrying out the polymerizing and copolymer isolation without using (adding) alkali metal salt in the polymerization/isolation system. By "high speed" is meant that the data transmission speed is at a frequency of least 10 GHz. EP 0 423 995 B1 discloses in Table 1 that fluorinated TFE/PPVE copolymer exhibits a dissipation factor which is better (lower) than that of fluorinated TFE/HFP copolymer at 500 MHz frequency (0.000366 vs 0.000605, respectively). Since the higher dissipation factor results in reduced signal strength, cable requiring the lower dissipation factor has used the more expensive TFE/PPVE copolymer and its subsequent improved TFE/PAVE copolymers as the primary insulation. The TFE/HFP copolymer of the present invention exhibits a dissipation factor that is about as good as TFE/PAVE copolymer at 500 MHz and this improvement carries over into still higher speed cable transmitting date at a frequency of at last 10 GHz, thus enabling the TFE/HFP copolymer of the present invention as described above to be used as the primary insulation (insulation covering the electrical conductor) in cable for the transmission of data at a frequency of at least 10 GHz, said cable comprising said electrical conductor and said insulation covering said conductor, said cable exhibiting a dissipation factor at 10 GHz of no greater than 0.00025. This cable is another embodiment of the present invention. Dissipation factor is measured on compression molded plaques in accordance with ASTM D 2520 and dissipation factor is measured on these plaques in accordance with the same ASTM procedure. It has been found that the dissipation factor determined by this procedure is a reliable predictor of the dissipation factor of the cable. Thus, in accordance with ASTM D 2520, the dissipation factor the molded plaque of the copolymer is considered to be the dissipation factor of the cable. The results of dissipation factors measurements is given in the following table:

| Copolymer | Dissipation factor | | |
|---|---|---|---|
| | 10 GHz | 15 GHz | 20 GHz |
| TFE/HFP copolymer (Example I) | 0.00023 | 0.00018 | 0.00018 |
| TFE/PAVE copolymer | 0.00022 | 0.00016 | 0.00018 |

The TFE/PAVE copolymer in the table contains 3.3 wt % PPVE and has a melt flow rate of 5. It is fluorinated to have less than 50 unstable end groups per $10^6$ carbon atoms. The dissipation factor of this copolymer is less than that of the fluorinated TFE/PPVE copolymer in Table 1 of EP 0 423 995 B1 at 450 MHz i.e. 0.00035 vs. 0.000366 in '995 (ASTM D 150), indicating that the comparison in the above table is with a better TFE/PAVE copolymer than that reported in the European patent, and yet the TFE/HFP copolymer of the present invention exhibits a dissipation factor that is just about as good as this better TFE/PAVE copolymer. Preferably, the dissipation factor of the cable at 15 GHz signal transmission frequency is no greater than 0.00022 and more preferably, no greater than 0.00020.

The cable of the present invention preferably is that wherein the thickness of the copolymer insulation is less than 9 mils (0.23 mm), and more preferably 6 to 8 mils (0.15 to 0.2 mm). The insulation may be foamed or unfoamed, i.e. solid. The foamed insulation may be present as the primary insulation in twisted pairs of cables or in coaxial cables. The improved dissipation factor exhibited by the copolymer of the present invention and the cable incorporating this copolymer as primary insulation can also be described as a process invention, the process being for transmitting data at a frequency of at least 10 GHz by a cable comprising an electrical conductor and insulation covering said conductor, comprising forming said insulation from the copolymer described above of and obtaining as a result thereof a dissipation factor for said transmitting by said cable of no greater than 0.00025 at 10 GHz.

What is claimed is:

1. A partially-crystalline copolymer comprising tetrafluoroethylene, hexafluoropropylene in an amount corresponding to a hexafluoropropylene index (HFPI) of from about 2.8 to 5.3, said copolymer being polymerized and isolated in the absence of added alkali metal salt, having a melt flow rate of within the range of about 30±3 g/10 min, and having no more than about 50 unstable endgroups/$10^6$ carbon atoms.

2. The copolymer of claim 1 having a melt flow rate within the range of about 30±2 g/10 min.

3. The copolymer of claim 1 further comprising from about 0.2% to 3% by weight of perfluoro(alkyl vinyl ether).

4. The copolymer of claim 3 wherein said perfluoro(alkyl vinyl ether) is perfluoro(propyl vinyl ether).

5. The copolymer of claim 3 wherein said perfluoro(alkyl vinyl ether) is perfluoro(ethyl vinyl ether).

6. The copolymer of claim 1 having no more than about 20 unstable endgroups/$10^6$ carbon atoms.

7. The copolymer of claim 1 wherein said alkali metal salt is a potassium salt.

* * * * *